United States Patent
Matsuura

(10) Patent No.: US 8,115,827 B2
(45) Date of Patent: Feb. 14, 2012

(54) COLOR PROCESSING APPARATUS AND COLOR PROCESSING METHOD

(75) Inventor: Takahiro Matsuura, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 12/422,463

(22) Filed: Apr. 13, 2009

(65) Prior Publication Data
US 2009/0256930 A1 Oct. 15, 2009

(30) Foreign Application Priority Data
Apr. 14, 2008 (JP) ................. 2008-104649

(51) Int. Cl.
*H04N 9/73* (2006.01)
*H04N 1/40* (2006.01)
*G06F 15/00* (2006.01)
*G03F 3/08* (2006.01)
*G06K 9/00* (2006.01)
*G09G 5/02* (2006.01)

(52) U.S. Cl. ............. 348/223.1; 358/1.9; 358/3.23; 358/518; 382/167; 345/591; 345/604

(58) Field of Classification Search ........... 348/223.1; 358/1.9, 3.23, 518; 382/167; 345/591, 604
See application file for complete search history.

(56) References Cited

U.S. PATENT DOCUMENTS

| 5,881,211 A * | 3/1999 | Matsumura ........ 358/1.9 |
| 6,137,494 A * | 10/2000 | Nin ................ 345/593 |
| 6,873,432 B1 * | 3/2005 | Thieret ............. 358/1.9 |
| 2008/0107332 A1 * | 5/2008 | Nishikuni et al. .... 382/166 |

FOREIGN PATENT DOCUMENTS

JP 2004341923 A 12/2004

\* cited by examiner

*Primary Examiner* — David Ometz
*Assistant Examiner* — Quang Le
(74) *Attorney, Agent, or Firm* — Canon U.S.A. Inc., I.P. Division

(57) ABSTRACT

A color processing apparatus for evaluating the gradation characteristic of a color conversion table that is used to convert signal values in input color space into signal values in output color space and has a plurality of grid points includes an acquisition unit configured to acquire signal values in the output color space corresponding to four adjacent grid points in the input color space through the color conversion table, a calculation unit configured to calculate a property of a tetrahedron formed by the signal values in the output color space, and an evaluation unit configured to evaluate a gradation characteristic of the color conversion table based on the property of the tetrahedron. The property of the tetrahedron may be the volume of the tetrahedron or the surface area of the tetrahedron.

18 Claims, 4 Drawing Sheets

COLOR PROCESSING APPARATUS AND COLOR PROCESSING METHOD

BACKGROUND OF THE INVENTION

1. Field of the Invention

The present invention relates to a color processing apparatus and a color processing method for evaluating the gradation characteristic of a color conversion table.

2. Description of the Related Art

In digital cameras in the related art, a plurality of color processing conditions corresponding to color processing modes are stored in advance. If one of these color processing modes is selected, color processing of captured image data is performed using a color processing condition corresponding to the selected color processing mode.

However, in such a digital camera in the related art, only color processing conditions stored in advance can be set, and it is therefore impossible to perform color reproduction in accordance with a user's preference.

Japanese Patent Laid-Open No. 2004-341923 discloses a color processing condition generation method allowing a user to freely set a color reproduction condition in accordance with the user's preference in an apparatus such as a digital camera. Using this method, it is possible to generate a color processing condition so that colors of an image obtained by capturing an image of a color chart including skin, sky, grass, and primary colors are closer to these original colors included in the color chart, or, for example, the above-described skin color is closer to a color desired by a user (hereinafter referred to as a target color).

Thus, in the related art, a user can optionally set a color processing condition capable of bringing colors of a captured image closer to desired colors. A color conversion table is generated in accordance with the color processing condition set by the user. The gradation characteristic of a final color conversion table to be output is not evaluated. Accordingly, if the gradation characteristic of the generated color conversion table is focused on, gradation reversal may occur. As a result, due to the gradation reversal, the gradation of a final image to be output may be lost.

SUMMARY OF THE INVENTION

In order to overcome the above-described problem, the present invention provides a color processing apparatus and a color processing method capable of evaluating the gradation characteristic of a color conversion table.

According to an exemplary embodiment of the present invention, there is provided a color processing apparatus for evaluating a gradation characteristic of a color conversion table that is used to convert signal values in input color space into signal values in output color space and has a plurality of grid points. The color processing apparatus includes: an acquisition unit configured to acquire signal values in the output color space corresponding to four adjacent grid points in the input color space through the color conversion table; a calculation unit configured to calculate a property of a tetrahedron formed by the signal values in the output color space; and an evaluation unit configured to evaluate a gradation characteristic of the color conversion table based on the property of the tetrahedron calculated by the calculation unit.

According to an exemplary embodiment, the property of the tetrahedron is the volume of the tetrahedron.

According to another exemplary embodiment, the property of the tetrahedron is the surface area of the tetrahedron.

According to an exemplary embodiment of the present invention, there is provided a color processing method of evaluating a gradation characteristic of a color conversion table that is used to convert signal values in input color space into signal values in output color space and has a plurality of grid points. The color processing method includes: acquiring signal values in the output color space corresponding to four adjacent grid points in the input color space through the color conversion table; calculating a property of a tetrahedron formed by the signal values in the output color space; and evaluating a gradation characteristic of the color conversion table on the based on the property of the tetrahedron.

According to another exemplary embodiment of the present invention, there is provided a computer-readable recording medium recording a computer program including computer-executable instructions for causing a computer to function a color processing apparatus to perform the color processing method.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will be described in detail below with reference to the accompanying drawings. The following embodiments do not limit the claims of the present invention, and not all combinations of features described in the embodiments are essential to the present invention.

Configuration

Figure 1:
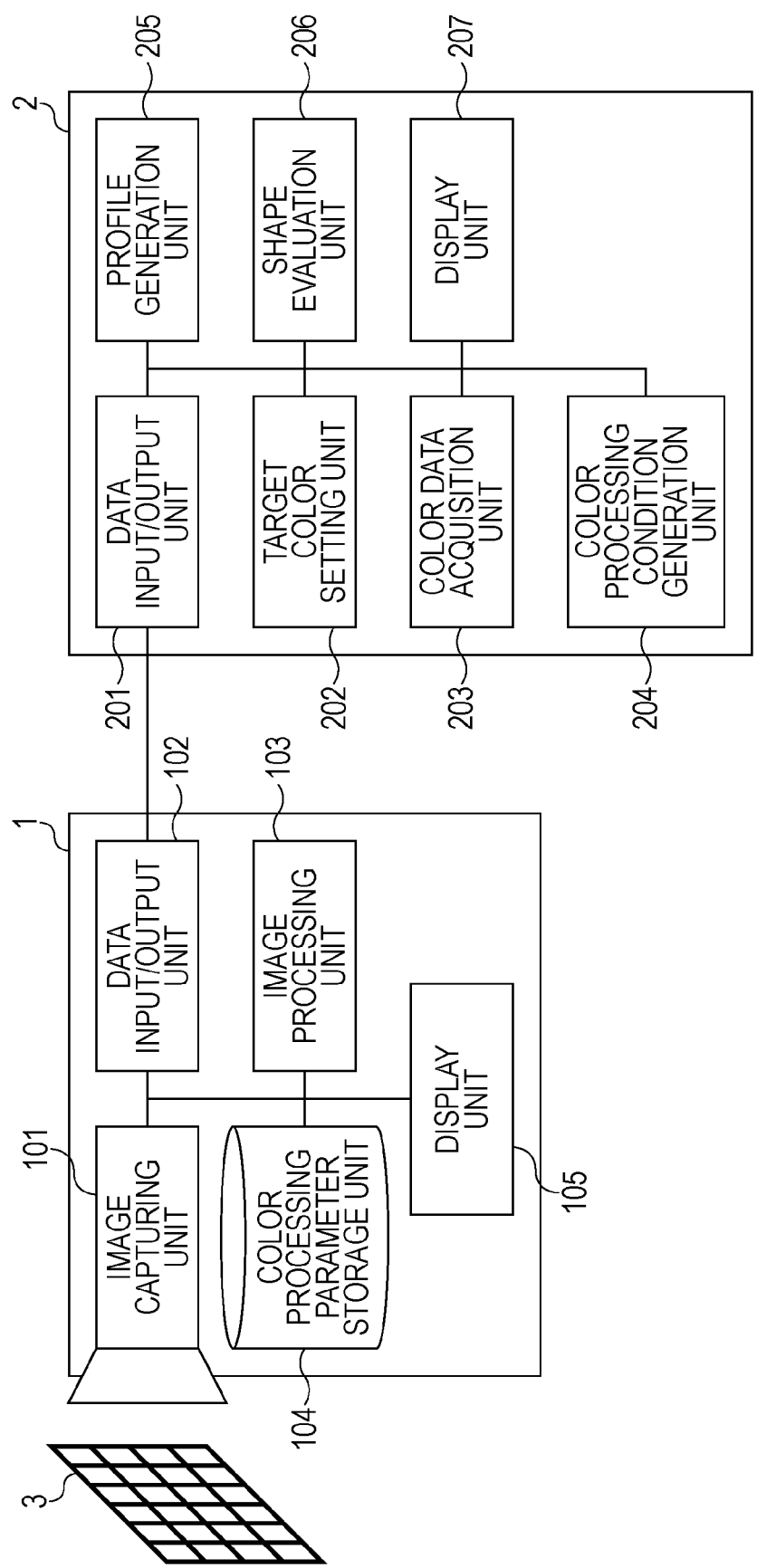
FIG. 1 illustrates a configuration according to a first embodiment.

FIG. 1 illustrates a configuration according to an exemplary embodiment.

Referring to FIG. 1, a digital camera 1, a profile creation apparatus 2, and a color chart 3 are illustrated. The digital camera 1 includes an image capturing unit 101 including an image capturing lens and an image sensor such as a CCD sensor, a data input/output unit 102 functioning as an interface for receiving/outputting image data and a color processing parameter from/to an external apparatus, an image processing unit 103 for performing, for example, color processing or brightness control processing, upon a subject image obtained by the image capturing unit 101 using a color processing parameter stored in a color processing parameter storage unit 104. The processed image data is output to the profile creation apparatus 2 via the data input/output unit 102. At that time, the image data may be directly output to the profile creation apparatus 2 via a cable, or may be output to a recording medium such as a CompactFlash®.

The digital camera 1 further includes the color processing parameter storage unit 104 for storing a color processing parameter and a display unit 105 that is, for example, a liquid crystal display for displaying a captured image obtained by the image capturing unit 101.

The profile creation apparatus 2 includes a data input/output unit 201 functioning as an interface for receiving/outputting image data and a color processing parameter from/to an external apparatus, a target color setting unit 202 for setting a target color for an obtained subject image, a color data acquisition unit 203 for calculating an RGB average value of each patch of an acquired image, a color processing condition generation unit 204 for optimizing a color processing parameter using a known method such as the DLS (Dumped Least Square) method and generating a color processing condition, a profile generation unit 205 for generating a profile using a color processing condition generated by the color processing condition generation unit 204, a shape evaluation unit 206 for evaluating the shape of a profile generated by the profile generation unit 205, and a display unit 207 for displaying a generated profile and a shape evaluation result.

Figure 2:
FIG. 2 illustrates an example of a color chart.

FIG. 2 illustrates an example of a color chart 3. The color chart 3 illustrated in FIG. 2 is a chart used for color design, and includes patches that individually correspond to a plurality of colors.

Figure 3:
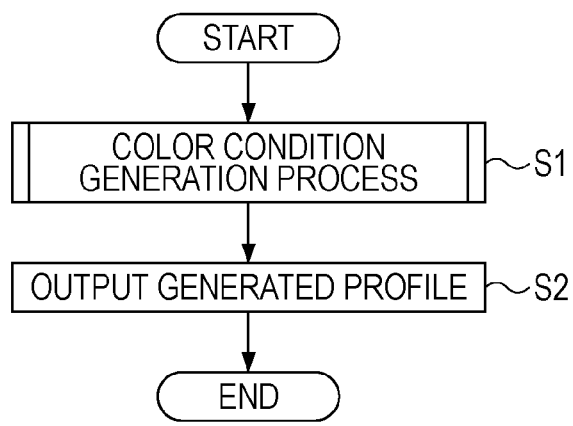
FIG. 3 illustrates a process performed by a profile creation apparatus.

FIG. 3 illustrates a process performed by the profile creation apparatus 2.

In step S1, the color processing condition generation unit 204 generates a color processing condition used to set a subject image target color acquired by the target color setting unit 202 for image data acquired by the color data acquisition unit 203, and generates a profile using the generated color processing condition. The processing of step S1 will be described in further detail later with reference to FIG. 4. In step S2, the profile generated in step S1 is output to the data input/output unit 201 and is then uploaded to the digital camera 1.

Color Processing Condition Generation Method

Figure 4:
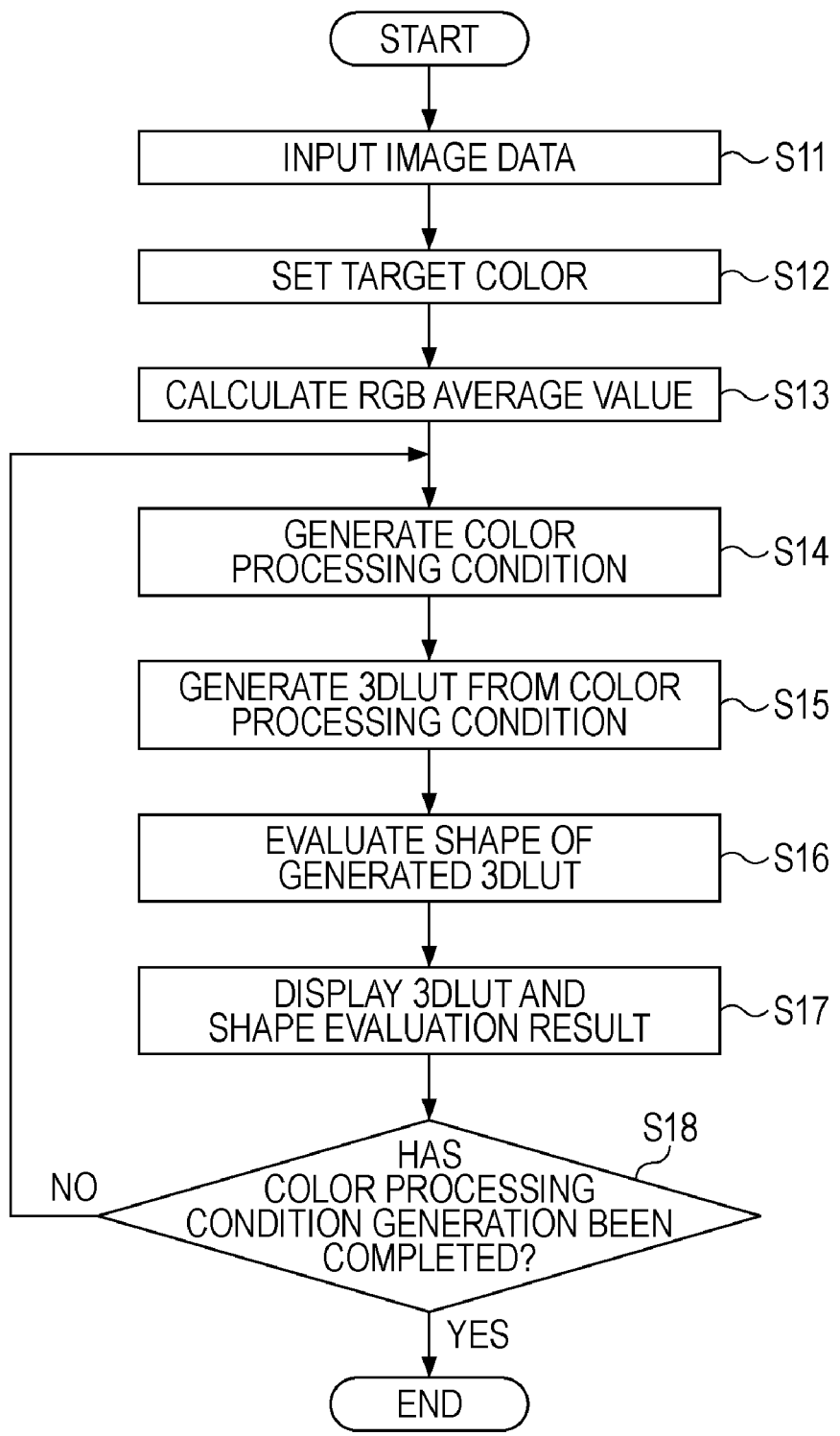
FIG. 4 illustrates a process of generating a color processing condition and calculating a shape evaluation value.

FIG. 4 illustrates details of the color processing condition generation method performed in step S1 illustrated in FIG. 3.

In step S11, the data input/output unit 201 receives image data of an image, for example, an RGB value (an exemplary case in which the RGB value is input as image data will be described). The image data may be directly received from a digital camera via a cable, or may be received from a recording medium such as a CompactFlash®. The image data is data of an image of the color chart 3.

In step S12, the target color setting unit 202 sets a target color. The target color is a calorimetric value obtained by calorimetrically measuring each patch of the color chart 3, which is a subject of the image data received in step S11, using a measurement device (not illustrated).

In step S13, the color data acquisition unit 203 acquires an RGB average value of each patch on the basis of the RGB value received in step S11.

In step S14, the color processing condition generation unit 204 generates a color processing condition. The color processing condition is represented by a 3×3 matrix or a 3×9 matrix. The matrix value of the matrix is calculated using a known optimization method such as the DLS method so that the matrix value can minimize the difference between the input data received in step S11 and the target color set in step S12. More specifically, the input data is converted into a CIELAB value (L*i, a*i, b*i) in such a manner that an R'G'B' value obtained by performing matrix computation upon the RGB average value acquired in step S13 is converted into the CIELAB value (L*i, a*i, b*i) under the assumption that the R'G'B' value is an sRGB value specified by IEC61966-2-1. The target color set in step S12 is obtained using a known conversion equation for converting a measured XYZ value in the XYZ calorimetric system into a CIELAB value (L*Ti, a*Ti, b*Ti). A matrix value that minimizes an entire evaluation function E given by the following equation is calculated. In the following equation, Ei denotes an evaluation function of each patch and wi denotes a weight value.

$$E = \sum_i w_i E_i = \sum_i w_i \sqrt{(L^*_{Ti} - L^*_i)^2 + (a^*_{Ti} - a^*_i)^2 + (b^*_{Ti} - b^*_i)^2} \quad (1)$$

An R'G'B' value calculation method, an equation for converting an RGB value into a CIEXYZ value, and an equation for converting a CIEXYZ value into a CIELAB value, which are used in step S14, are described below.

R'G'B' Value Calculation Method

First, the input RGB value is normalized. Normalization is performed by dividing each of R, G, and B values by 1023 ($=2^{10}-1$) if the input RGB value is a 10-bit value. Using one of equations (2) to (4), the R'G'B' value is calculated.

$$\begin{pmatrix} R' \\ G' \\ B' \end{pmatrix} = M1 \begin{pmatrix} R \\ G \\ B \end{pmatrix} \quad (2)$$

$$\begin{pmatrix} R' \\ G' \\ B' \end{pmatrix} = M2 \begin{pmatrix} R \\ G \\ B \\ RR \\ RG \\ RB \\ GG \\ GB \\ BB \end{pmatrix} \quad (3)$$

$$\begin{pmatrix} R' \\ G' \\ B' \end{pmatrix} = M3 \begin{pmatrix} R \\ G \\ B \\ RR \\ RG \\ RB \\ GG \\ GB \\ BB \\ RRR \\ RRG \\ RRB \\ RGG \\ RGB \\ RBB \\ GGG \\ GGB \\ GBB \\ BBB \end{pmatrix} \quad (4)$$

In the above-described equations, M1 denotes a 3×3 matrix, M2 denotes a 3×9 matrix, and M3 denotes a 3×19 matrix.

RGB→CIEXYZ Conversion Equation $R_{liner}=R_{sRGB}/12.92$ when $R_{sRGB} \leq 0.04045$ $R_{liner}=((R_{sRGB}+0.055)/1.055)^{2.4}$ when $R_{sRGB}>0.04045$ (5)

$G_{liner}=G_{sRGB}/12.92$ when $G_{sRGB} \leq 0.04045$ $G_{liner}=((G_{sRGB}+0.055)/1.055)^{2.4}$ when $G_{sRGB}>0.04045$ (6)

$B_{liner}=B_{sRGB}/12.92$ when $B_{sRGB} \leq 0.04045$ $B_{liner}=((B_{sRGB}+0.055)/1.055)^{2.4}$ when $B_{sRGB}>0.04045$ (7)

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{liner} \\ G_{liner} \\ B_{liner} \end{pmatrix} \times 100.0 \quad (8)$$

CIEXYZ→CIELAB Conversion Equation $Xn=95.045$ $Yn=100.000$ $Zn=108.892$ (9)

$X\text{Rate}=(X/Xn)^{1/3}$ when $X/Xn>0.00856$ $X\text{Rate}=7.787\times(X/Xn)+16.0/116.0$ when $X/Xn \leq 0.00856$ (10)

$Y\text{Rate}=(Y/Yn)^{1/3}$ when $Y/Yn>0.00856$ $Y\text{Rate}=7.787\times(Y/Yn)+16.0/116.0$ when $Y/Yn \leq 0.00856$ (11)

$Z\text{Rate}=(Z/Zn)^{1/3}$ when $Z/Zn>0.00856$ $Z\text{Rate}=7.787\times(Z/Zn)+16.0/116.0$ when $Z/Zn \leq 0.00856$ (12)

$L^*=116.0\times(Y/Yn)^{1/3}-16.0$ when $Y/Yn>0.00856$ $L^*=903.29\times(Y/Yn)$ when $Y/Yn \leq 0.00856$ (13)

$a^*=500\times(X\text{Rate}-Y\text{Rate})$ $b^*=200\times(Y\text{Rate}-Z\text{Rate})$ (14)

In step S15, the profile generation unit 205 generates a profile using the color processing condition generated in step S14. The profile is, for example, a 3DLUT (three-dimensional lookup table) in which each of grid points arranged in a grid pattern corresponds to an input color signal in color space. A 3DLUT profile generation method is as follows when it is assumed that input RGB data of a digital camera is 10-bit data (0-1023) and the number of slices (the number of steps of each of input color signals (R, G, and B signals) in color space) is 17.
(R, G, B)=
(0, 0, 0), (0, 0, 64), (0, 0, 128), ... ,
(0, 0, 1023), (0, 64, 0), (0, 64, 64), ... ,
(0, 64, 1023), (0, 128, 0), (0, 128, 64), ... , (1023, 1023, 1023)
The profile generation unit 205 sequentially receives the above-described 4913 (=17×17×17) pieces of data, and calculates an R'G'B' value using the generated color processing condition. The R'G'B' value is converted into a CIELAB (L*a*b*) value under the assumption that the R'G'B' value is an sRGB value specified by IEC61966-2-1 defined by International Electrotechnical Commission (IEC). The calculated 4913 relationships between an RGB value (R, G, B) and an L*a*b* value (L*, a*, b*) that is an output color signal are used as a 3DLUT.

In step S16, the shape evaluation unit 206 evaluates the shape of the 3DLUT generated in step S15. For example, the shape evaluation unit 206 evaluates the shape of the 3DLUT using the volume of each tetrahedron formed by output values in output color space.

Figure 5:
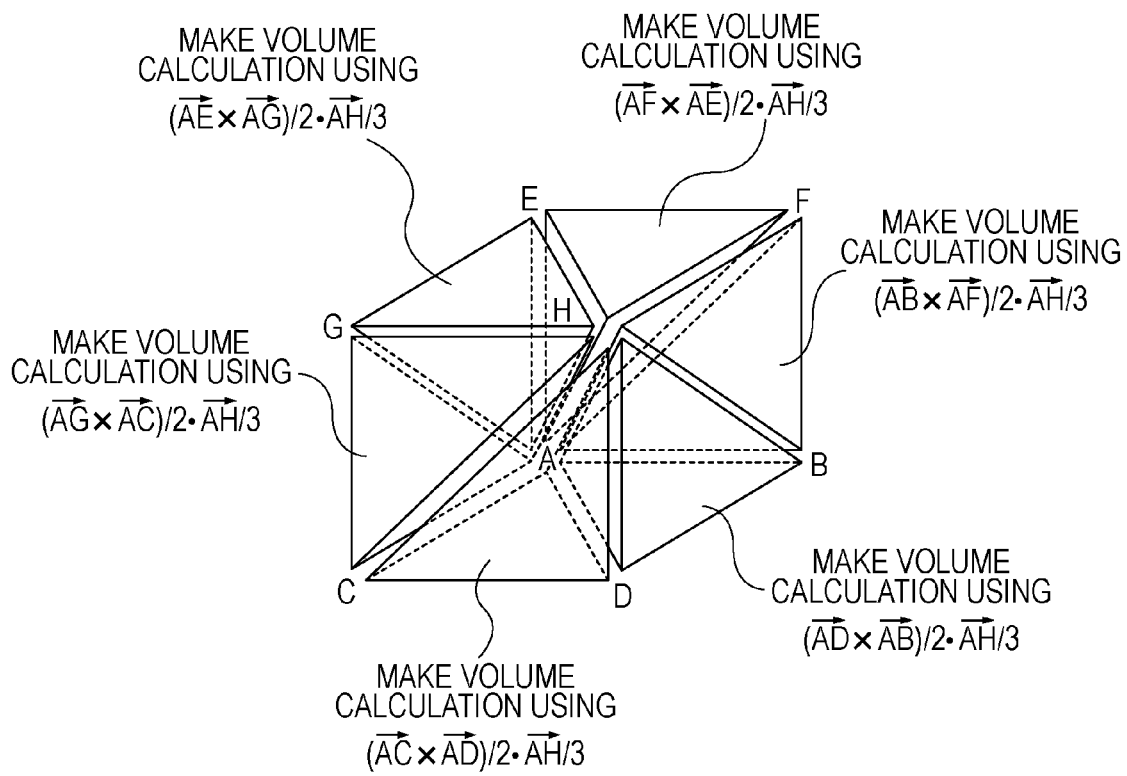
FIG. 5 illustrates a method of calculating the volume of each tetrahedron.

As illustrated in FIG. 5, the volume of a 3DLUT is calculated by dividing a 3DLUT into tetrahedrons and calculating a volume V of each of the tetrahedrons using inner products and outer products of vectors representing vertices of the tetrahedron. Referring to FIG. 5, × denotes a vector outer product and · denotes a vector inner product. The volume V of each tetrahedron is calculated as follows when it is assumed that vectors of optional three sides are a, b, and c.

$$V=(a\times b)\cdot c/6 \quad (15)$$

(× represents a vector outer product and · represents a vector inner product.)

If the volume of each tetrahedron forming a 3DLUT is calculated using the equation illustrated in FIG. 5, a calculation result is a positive value when the gradation is not reversed and is a negative value when the gradation is reversed. A gradation reversal ratio R is calculated using the following equation in which P is the number of tetrahedrons when the calculation result is a positive value, Z is the number of tetrahedrons when the calculation result is zero, and M is the number of tetrahedrons when the calculation result is a negative value.

$$R=M/(P+Z+M) \quad (16)$$

Figure 6:
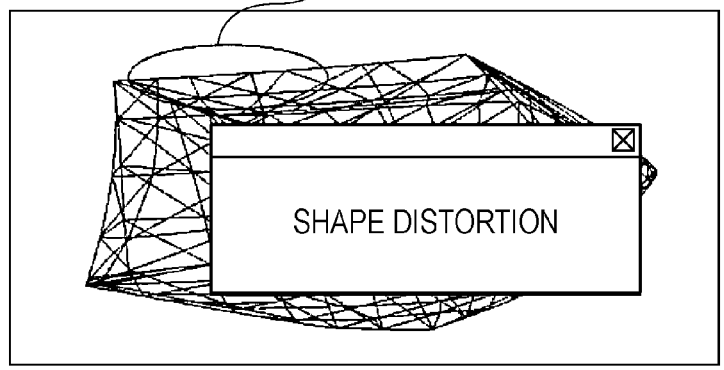
FIG. 6 illustrates examples of a 3DLUT and an alert.

In step S17, the display unit 207 displays the generated 3DLUT and a gradation evaluation result as illustrated in FIG. 6. If the value of the volume V calculated using equation (15) is equal to or less than zero or the value of the gradation reversal ratio R calculated using equation (16) is equal to or larger than a predetermined value, an alert is generated.

In step S18, the color processing condition generation unit 204 determines whether the color processing condition generation process should be terminated. If it is determined that the color processing condition generation process should be terminated, the process ends. If it is determined that the color processing condition generation process should be continued, the process proceeds to step S14.

In this embodiment, an exemplary case in which a profile is generated has been described. However, instead of such a profile, a color conversion table for converting an input color signal into an output color signal may be generated.

In the above-described embodiment, equation (1) is used as an evaluation function. However, in another exemplary embodiment, $\Delta E94$ represented by the following equation in which Wi is a weight value for each patch may also be used.

$$E = \sum_i W i E_i \quad (17)$$

$$= \sum_i W i \sqrt{\Delta L^{*2} + \left(\frac{\Delta C^*}{1+0.045C_1}\right)^2 + \left(\frac{\Delta H^*}{1+0.015C_1}\right)^2}$$

-continued $$\begin{cases} \Delta E = \sqrt{L_{Ti}^{*2} + a_{Ti}^{*2} + b_{Ti}^{*2}} \\ \Delta L^* = L_{Ti}^* - L_i^* \\ \Delta C^* = \sqrt{a_{Ti}^{*2} + b_{Ti}^{*2}} - \sqrt{a_i^{*2} + b_i^{*2}} \\ \Delta H = \sqrt{\Delta E^2 - \Delta L^{*2} - \Delta C^{*2}} \\ C_1 = \sqrt{a_{Ti}^{*2} + b_{Ti}^{*2}} \end{cases}$$

In the above-described embodiments, the three-dimensional shape of a 3DLUT is evaluated using the gradation reversal ratio of tetrahedrons forming the 3DLUT in output color space for a gradation characteristic of the 3DLUT. However, the three-dimensional shape of a 3DLUT may be evaluated on the basis of irregularities on the surface of the 3DLUT for the gradation characteristic of the 3DLUT.

The irregularities on the surface of the 3DLUT can be obtained by calculating the ratio between the surface area of a sphere having the same volume as that of the generated 3DLUT and the surface area of the generated 3DLUT. The volume of the generated 3DLUT is calculated by dividing the 3DLUT into tetrahedrons, and calculating the volume of each of the tetrahedrons using inner products and outer products of vectors representing vertices of the tetrahedron as illustrated in FIG. 5. Referring to FIG. 5, × denotes a vector outer product and · denotes a vector inner product. A surface area St of the 3DLUT is calculated using the following equations in which S denotes the area of the outermost triangle, a and b denote vectors of two optional sides, ∥ denotes the size of a vector, and × denotes a vector outer product.

$$St = \Sigma S \qquad (18)$$

$$S = |a \times b|/2 \qquad (19)$$

A surface area Sc of a sphere having the volume V is calculated using the following equation.

$$Sc = \sqrt[3]{36\pi V^2} \qquad (20)$$

If the value of St/Sc is calculated using St and Sc calculated using equations (18) to (20) and is equal to or larger than a predetermined value, or if the value of the gradation reversal ratio R calculated using equation (16) is equal to or larger than a predetermined value, an alert is generated.

The present invention may be applied to a system composed of a plurality of devices (for example, a computer, an interface device, a reader, and a printer) or to an apparatus composed of a single device (for example, a copier, a fax, or a control device).

The present invention may be achieved in such a manner that a storage medium storing a computer program for implementing the functions of the above-described embodiments is supplied to a system or an apparatus, and a computer (or a CPU or MPU) of the system or apparatus reads out the computer program from the storage medium and executes the read computer program. In this case, a computer program itself read out from the storage medium achieves the functions of the above-described embodiments. That is, the present invention also includes the computer program and the computer-readable storage medium storing the computer program.

The computer executes the read computer program to achieve the functions of the above-described embodiments. Furthermore, an OS (Operating System) and/or first, second, and third programs running on the computer may perform part or all of actual processing under instructions of the computer program to achieve the functions of the above-described embodiments.

Still furthermore, the computer program may be written to a memory provided in a function expansion card or a function expansion unit connected to the computer. Subsequently, a CPU or the like provided in first, second and third devices may perform part or all of actual processing under instructions of the computer program so as to achieve the functions of the above-described embodiments.

If the present invention is applied to the above-described storage medium, a computer program corresponding to the above-described flowcharts is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-104649 filed Apr. 14, 2008, which is hereby incorporated by reference herein in its entirety.

What is claimed is:

1. A color processing apparatus for evaluating a gradation characteristic of a color conversion table that is used to convert signal values in input color space into signal values in output color space and has a plurality of grid points, the color processing apparatus comprising:
an acquisition unit configured to acquire signal values in the output color space corresponding to four adjacent grid points in the input color space through the color conversion table;
a calculation unit configured to calculate a property of a tetrahedron formed by the signal values in the output color space; and
an evaluation unit configured to evaluate a gradation characteristic of the color conversion table based on the property of the tetrahedron calculated by the calculation unit,
wherein the property of the tetrahedron calculated by the calculation unit is the volume of the tetrahedron,
wherein the tetrahedron is obtained by dividing a cube formed by the grid points in the output color space, and
wherein the calculation unit calculates the volume of the tetrahedron using inner products and outer products of vectors connecting vertices represented by the signal values in the output color space so that the volume of the tetrahedron is a positive value when the gradation characteristic is not reversed.

2. The color processing apparatus according to claim 1, further comprising an alert unit configured to alert a user of a result of evaluation performed by the evaluation unit.

3. The color processing apparatus according to claim 1, wherein the evaluation unit determines that the gradation characteristic is normal in a case where the volume of the tetrahedron is a positive value, determines that the gradation characteristic is eliminated in a case where the volume of the tetrahedron is zero, and determines that the gradation characteristic is reversed in a case where the volume of the tetrahedron is a negative value.

4. A color processing apparatus for evaluating a gradation characteristic of a color conversion table that is used to convert signal values in input color space into signal values in output color space and has a plurality of grid points, the color processing apparatus comprising:
an acquisition unit configured to acquire signal values in the output color space corresponding to four adjacent grid points in the input color space through the color conversion table;

a calculation unit configured to calculate a property of a tetrahedron formed by the signal values in the output color space; and an evaluation unit configured to evaluate a gradation characteristic of the color conversion table based on the property of the tetrahedron calculated by the calculation unit, wherein the property of the tetrahedron is the surface area of the tetrahedron, wherein the tetrahedron is obtained by dividing a cube formed by the grid points in the output color space, and wherein the calculation unit calculates the surface area of the tetrahedron using inner products and outer products of vectors connecting vertices represented by the signal values in the output color space so that the surface area of the tetrahedron is a positive value when the gradation characteristic is not reversed.

5. The color processing apparatus according to claim 4, wherein the evaluation unit determines that the gradation characteristic is normal in a case where the surface area of the tetrahedron is a positive value, determines that the gradation characteristic is eliminated in a case where the surface area of the tetrahedron is zero, and determines that the gradation characteristic is reversed in a case where the surface area of the tetrahedron is a negative value.

6. The color processing apparatus according to claim 4, further comprising an alert unit configured to alert a user of a result of evaluation performed by the evaluation unit.

7. A color processing method for a color processing apparatus to perform evaluation of a gradation characteristic of a color conversion table that is used to convert signal values in input color space into signal values in output color space and has a plurality of grid points, the color processing method comprising:

acquiring signal values in the output color space corresponding to four adjacent grid points in the input color space through the color conversion table;

calculating a property of a tetrahedron formed by the signal values in the output color space; and evaluating a gradation characteristic of the color conversion table based on the calculated property of the tetrahedron, wherein the property of the tetrahedron is the volume of the tetrahedron, wherein the tetrahedron is obtained by dividing a cube formed by the grid points in the output color space, and wherein the volume of the tetrahedron is calculated using inner products and outer products of vectors connecting vertices represented by the signal values in the output color space so that the volume of the tetrahedron is a positive value when the gradation characteristic is not reversed.

8. A non-transitory computer-readable recording medium recording a computer program having computer-executable instructions for causing a computer to function as a color processing apparatus to perform the color processing method according to claim 7.

9. The color processing method according to claim 7, further comprising alerting a user of a result of evaluation.

10. A non-transitory computer-readable recording medium recording a computer program having computer-executable instructions for causing a computer to function as a color processing apparatus to perform the color processing method according to claim 9.

11. The color processing method according to claim 7, wherein it is determined that the gradation characteristic is normal in a case where the volume of the tetrahedron is a positive value, that the gradation characteristic is eliminated in a case where the volume of the tetrahedron is zero, and that the gradation characteristic is reversed in a case where the volume of the tetrahedron is a negative value.

12. A non-transitory computer-readable recording medium recording a computer program having computer-executable instructions for causing a computer to function as a color processing apparatus to perform the color processing method according to claim 11.

13. A color processing method for a color processing apparatus to perform evaluation of a gradation characteristic of a color conversion table that is used to convert signal values in input color space into signal values in output color space and has a plurality of grid points, the color processing method comprising:

acquiring signal values in the output color space corresponding to four adjacent grid points in the input color space through the color conversion table; calculating a property of a tetrahedron formed by the signal values in the output color space; and evaluating a gradation characteristic of the color conversion table based on the calculated property of the tetrahedron, wherein the calculated property of the tetrahedron is the surface area of the tetrahedron, wherein the tetrahedron is obtained by dividing a cube formed by the grid points in the output color space, and wherein the surface area of the tetrahedron is calculated using inner products and outer products of vectors connecting vertices represented by the signal values in the output color space so that the surface area of the tetrahedron is a positive value when the gradation characteristic is not reversed.

14. A non-transitory computer-readable recording medium recording a computer program having computer-executable instructions for causing a computer to function as a color processing apparatus to perform the color processing method according to claim 13.

15. The color processing method according to claim 13, further comprising alerting a user of a result of evaluation.

16. A non-transitory computer-readable recording medium recording a computer program having computer-executable instructions for causing a computer to function as a color processing apparatus to perform the color processing method according to claim 15.

17. The color processing method according to claim 13, wherein it is determined that the gradation characteristic is normal in a case where the surface area of the tetrahedron is a positive value, that the gradation characteristic is eliminated in a case where the surface area of the tetrahedron is zero, and that the gradation characteristic is reversed in a case where the surface area of the tetrahedron is a negative value.

18. A non-transitory computer-readable recording medium recording a computer program having computer-executable instructions for causing a computer to function as a color processing apparatus to perform the color processing method according to claim 17.

* * * * *